(12) United States Patent
Teodoro et al.

(10) Patent No.: US 7,840,594 B2
(45) Date of Patent: Nov. 23, 2010

(54) METHOD AND SYSTEM FOR COMMUNICATING BETWEEN AN EMBEDDED DEVICE AND RELATIONAL DATABASES

(75) Inventors: Jose Lourenco Teodoro, Austin, TX (US); Fabio de Souza Terezinho, Sao Paulo (BR); Marcos Taccolini, Austin, TX (US); Luis Fernando Maximo Rodas, Braganca Paulista (BR)

(73) Assignee: Indusoft, Inc., Austin, TX (US)

( * ) Notice: Subject to any disclaimer, the term of this patent is extended or adjusted under 35 U.S.C. 154(b) by 0 days.

(21) Appl. No.: 11/243,780

(22) Filed: Oct. 5, 2005

(65) Prior Publication Data

US 2007/0078839 A1 Apr. 5, 2007

Related U.S. Application Data

(60) Provisional application No. 60/646,041, filed on Jan. 14, 2005.

(51) Int. Cl.
*G06F 17/30* (2006.01)

(52) U.S. Cl. ...................................... 707/781; 707/809

(58) Field of Classification Search ............... 707/1–10, 707/100, 101, 102, 104.1, 200, 203, 781, 707/809, 999.1, 999.01, 999.101, 999.102, 707/999.104, 999.2; 709/201, 203, 210, 709/223, 226
See application file for complete search history.

(56) References Cited

U.S. PATENT DOCUMENTS

| | | | | |
|---|---|---|---|---|
| 6,438,559 | B1* | 8/2002 | White et al. | 707/103 R |
| 2003/0023601 | A1* | 1/2003 | Fortier et al. | 707/10 |
| 2003/0093433 | A1* | 5/2003 | Seaman et al. | 707/102 |
| 2004/0006563 | A1* | 1/2004 | Zwiegincew et al. | 707/10 |
| 2004/0030770 | A1* | 2/2004 | Pandya | 709/223 |
| 2006/0230340 | A1* | 10/2006 | Parsons et al. | 715/514 |

* cited by examiner

*Primary Examiner*—Marc R Filipczyk
(74) *Attorney, Agent, or Firm*—Hulsey, P.C.; William N. Hulsey, III

(57) ABSTRACT

Techniques for communicating between an embedded device and remote database(s) for a wide variety of applications, including human machine interface, supervisory control, data acquisition, and B2B applications. An application program interface (API), interfacing an application program seeking access to a predetermined database, operates on an operating system (OS) not operating a database driver program. A parser translates communications with the API into and from commands and formatted data of an OS independent form. A protocol stack formats the commands and formatted data into header formatted communications signals to accord with a predetermined protocol. Another protocol stack receives the header formatted communications signals, removes header data, and generates database communications signals. Another parser receives the database communications signals and generates and communicates a plurality of database formatted SQL commands. A database interface interfaces the predetermined database and communicates the database formatted SQL commands with the predetermined database.

37 Claims, 5 Drawing Sheets

METHOD AND SYSTEM FOR COMMUNICATING BETWEEN AN EMBEDDED DEVICE AND RELATIONAL DATABASES

This application claims the benefit of priority under 35 U.S.C. §119(e) to application No. 60/646,041, filed Jan. 24, 2005, entitled "Database Gateway Method" by Jose Lourenco Teodoro which is hereby fully incorporated by reference.

FIELD

The disclosed subject matter relates to data communications within networked computer systems and related software. More particularly, this disclosure relates to a novel and improved method and system for communicating between an embedded device and at least one of potentially many relational databases.

DESCRIPTION OF THE RELATED ART

In many industries there is the need for software products that permit developing and using Windows®-based applications in industrial automation, instrumentation and embedded systems. Such systems empower workers and companies to develop graphical interfaces, integrate web browsers, and take advantage of Internet connectivity. Some of the more attractive applications use the Internet to access data that is stored on industrial devices and test and measurement equipment. In addition, such tools and technologies convert personal computers, web browsers, and remote productivity devices such as cell phones, pagers, and personal digital assistants (PDAs) into industrial automation and test and measurement systems.

As technologies emerge for acquiring data in real time from a variety of real-world devices and displays, and accesses real-time, dynamic, and animated graphic screens, trends, recipes, and reports on the most popular web browsers, imports and exports data in XML format for easy integration with corporate and business applications there is the need to integrate seamlessly with databases and the Microsoft® Office Suite® and similar application programs. Such systems must provide a strong architecture that encompasses the latest standards and technology in the wireless, mobile, distributed, and Internet areas.

One particularly important area of software development is known as Rapid Application Development Environment. These applications allow organizations to increase productivity and establish predictive and preventative maintenance strategies that result in optimum process uptime and availability. In such uses, there is often the need to access databases that may store and provide to the application information for use in a real-time environment.

In the traditional approaches, in order to utilize Object Linking Embedded-Database® (OLE-DB®) and Open Database Connectivity® (ODBC®), or ActiveX Data Objects® (ADO®) to interface to local or remote database(s), the HMI/SCADA device must have an ODBC driver and/or ADO® provider developed for and running on the operating system supporting the Rapid Application Development software. For devices based on the Microsoft® Windows® CE®, Linux® or other embedded devices, these ODBC® drivers or ADO® providers may not exist.

Accordingly, a need exists for a method and system for Rapid Application Development software to read and write real-time machine or process data to any local or remote database, including, for example, a SQL relational database, without the need for database driver interfaces to be supported on the operating system supporting the application.

SUMMARY

Techniques for providing novel and improved methods and systems for communicating between an apparatus and at least one relational database are disclosed, which techniques improve both the operation of industrial device software applications and promote the efficient use of data residing and storable in a variety of relational databases and the like. The disclosed subject matter, therefore, enhances the use of real-time, dynamic, applications reporting alarms, trends, recipes, and reports of industrial devices to provide a strong architecture that encompasses the latest standards and technology in the wireless, mobile, distributed, and Internet areas.

According to one aspect of the disclosed subject matter, techniques for communicating between an industrial apparatus and at least one remote database include a database communications system that uses a database communications gateway between a plurality of applications and a predetermined database. The database communications gateway includes an application program interface for interfacing at least one application program which may seek to access a predetermined database and which application program operates on an operating system not operating a database driver program. A first parser translates communications with the application program interface into commands and formatted data, which commands and formatted data are in an operating system independent form. A first protocol stack formats the commands and formatted data into header formatted communications signals which accord with a predetermined protocol and communicates the header formatted communications signals. A second protocol stack receives the header formatted communications signals and removes header data from the header formatted communications signals for generating database communications signals. A second parser receives the database communications signals, generates from the database communications a plurality of database-formatted communications signals, and communicates the database-formatted communications signals to a database interface. The database interface interfaces the predetermined database and communicates the database-formatted communications signals with the predetermined database.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter will become more apparent from the detailed description set forth below when taken in conjunction with the drawings in which like reference characters identify correspondingly throughout and wherein.

Figure 7:
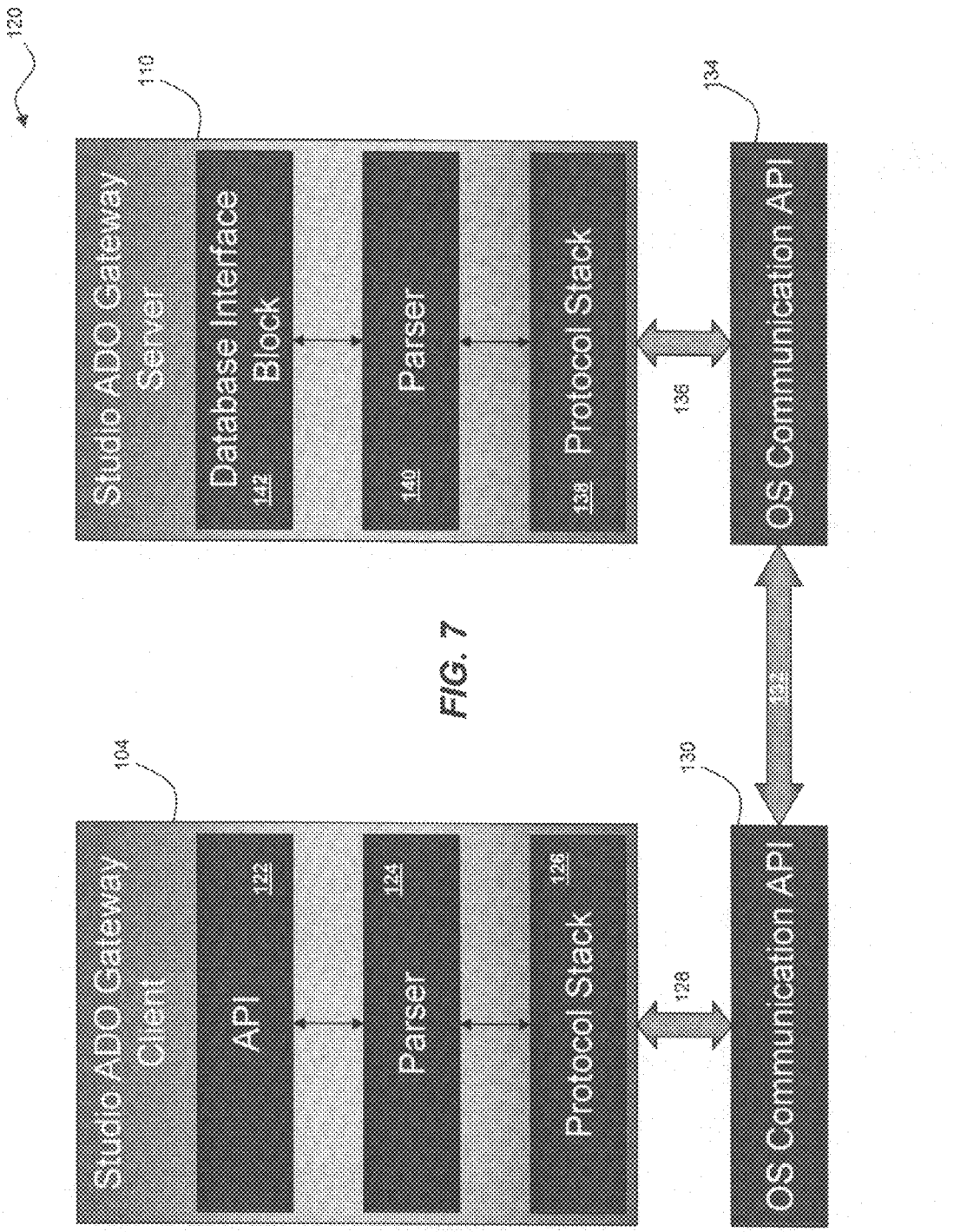
Figure 8:
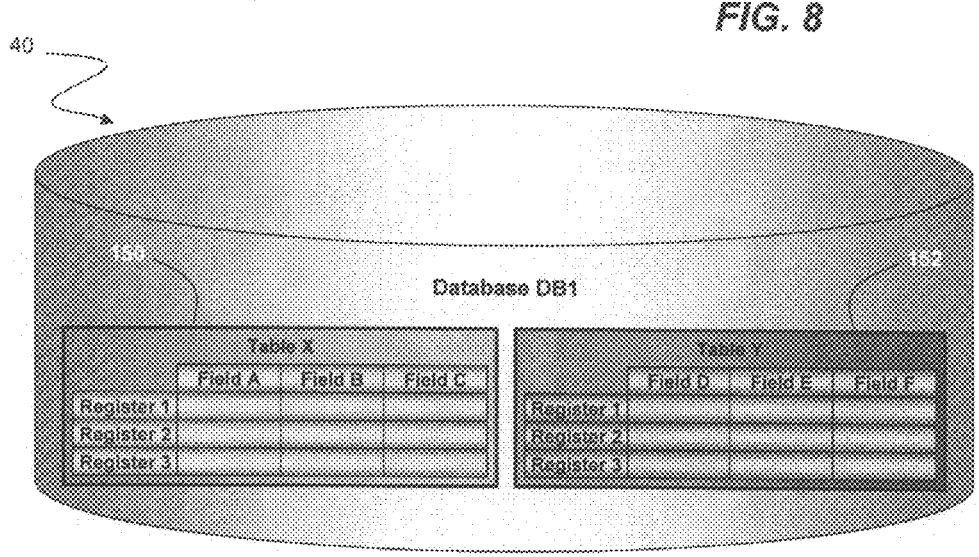
Figure 9:
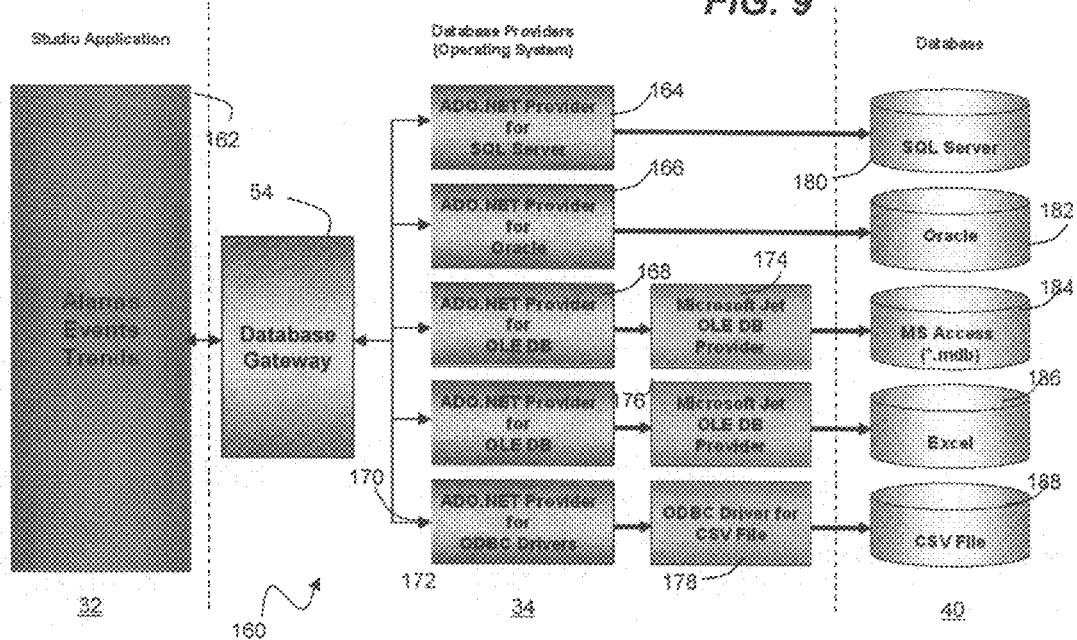

FIG. 7 presents an exemplary client-server environment in which to practice aspects of the present disclosure;

FIG. 8 depicts functional aspects of a relational database that may be accessed using an embodiment of the disclosed subject matter; and FIG. 9 further portrays an application of the disclosed subject matter enabling access to and communications with a plurality of databases operating under a variety of protocols.

DETAILED DESCRIPTION OF THE SPECIFIC EMBODIMENTS

Figure 1:
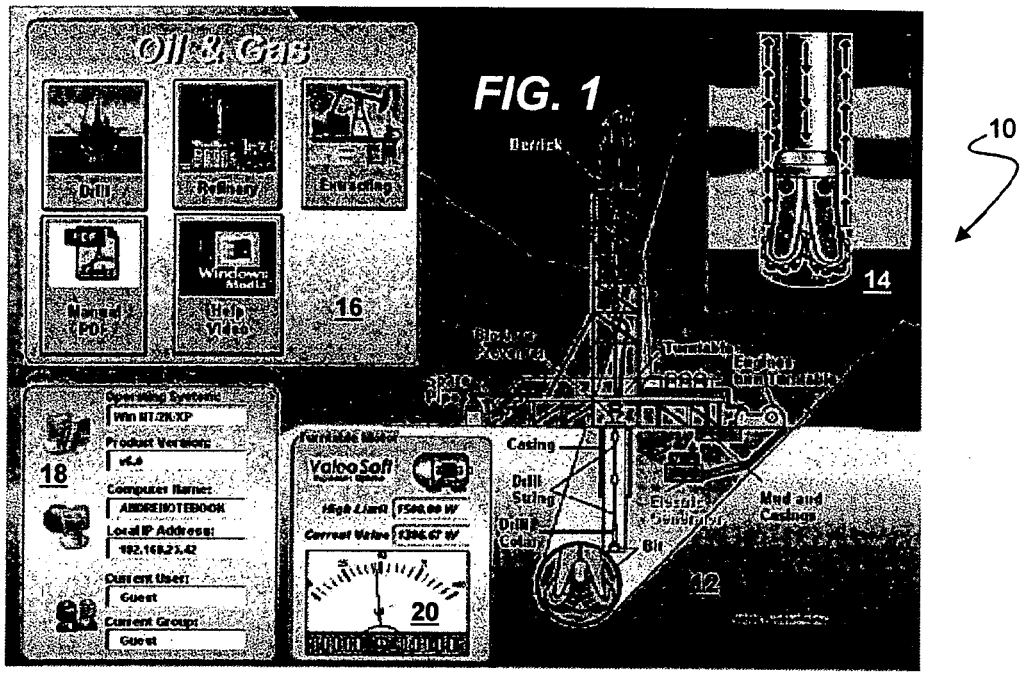
FIG. 1 depicts an exemplary industrial environment in which the teachings of the disclosed subject matter may provide particular advantages and numerous benefits.

The disclosed subject matter for providing novel and improved methods and systems for communicating between an industrial apparatus and at least one relational database has use in an essentially unlimited number of industrial, clinical, embedded, and other manufacturing, service providing, and process control environments requiring rapid application development applications with strong relational database integration. One such application appears in FIG. 1, which portrays oil field 10 wherein a drilling application employs drill bit 12 for boring a hole to explore and produce oil. As inset 14 shows, a drill bit may bore through various layers of earth. A user of an electronic device, such as a Web-enabled PDA, cell phone or other device may desire, and, through using the subject matter here disclosed, be empowered to receive many types of information relating to oil-field operations and supporting optimal management on and production from oil field 10.

As inset 16 shows, for example, the user may receive information relating to drilling operations, refining operations, extracting operations, and the like, as well as receive documents and streaming tutorials of relevance and beneficial to oil field 10 production. As inset 18 shows, the same user may use various operational and Internet access controls, as well as control user information and group information using such a device. Furthermore, inset 20 depicts the aspect of the present disclosure that may relate to the monitoring of equipment in and around the various sites of oil field 10. Many of these applications may use third party software applications. Many such applications may also provide stand-alone operation, not requiring database access. However, for applications capable of making effective use of SQL relational databases, for example, the present disclosure provides major improvements in the operations of oil field 10 and control of devices and systems therein. Such improvements, it should be clear, have application in a great many industrial environments for the improved operations and controls of a wide variety of industrial equipment and devices and systems for such equipment and devices.

Figure 2:
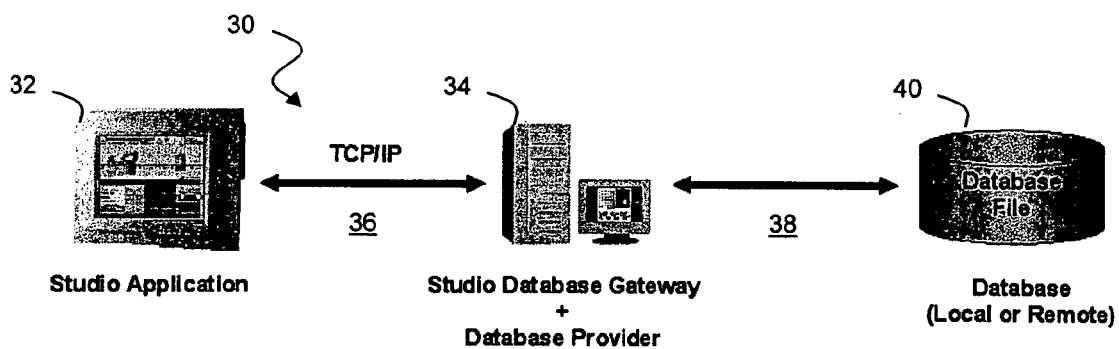
FIG. 2 is a simplified block diagram of a data base communications system that may implement the present embodiment.

FIG. 2 is a simplified diagram of database communications system 30 that may implement the teachings of the present disclosure. In particular, FIG. 2 portrays the concept that database communications system 30 may provide for use of application software at application site 32. Application site 32, which may use any one of a variety of applications, interfaces and communicates with database gateway site 34 via, for example, a TCP/IP connection 36. As such, database gateway site 34 may be a location remote from application software site 32. Database gateway site 34 includes software that associates with a database provider and provides access path 38 to communicate with one of a variety of database files at database file site 40.

Database communications system 30 may used, for example, in conjunction with the InduSoft® Web Studio®, described in further detail below, at application site 32 to provide for database file 40 access for a variety of human-machine interface (HMI) and supervisory control and data acquisition (SCADA) applications. HMI applications provide a variety of interface functions with human operators and the machines they may control. SCADA applications, on the other hand, monitor and control large manufacturing machinery or processes. Database communications system 30 provides a means for using these classes of devices on operating systems such as Microsoft® Windows® CE®, Linux®, or other embedded operating systems and, most importantly, interface valuable data and commands that may operate on remote SQL (Structured Query Language) relational and other similar databases. Database communications system 30 implements a generic connection enabling HMI/SCADA applications to route the requested remote database operation to a desktop computer, running Windows® XP®, or Windows® 2000®, which use ADO.NET® to provide an intuitive, simple, flexible and powerful interface with any database compatible with MDAC® (Microsoft Data Access Components), using underlying technologies such as OLE-DB® and ODBC®.

Figure 3:
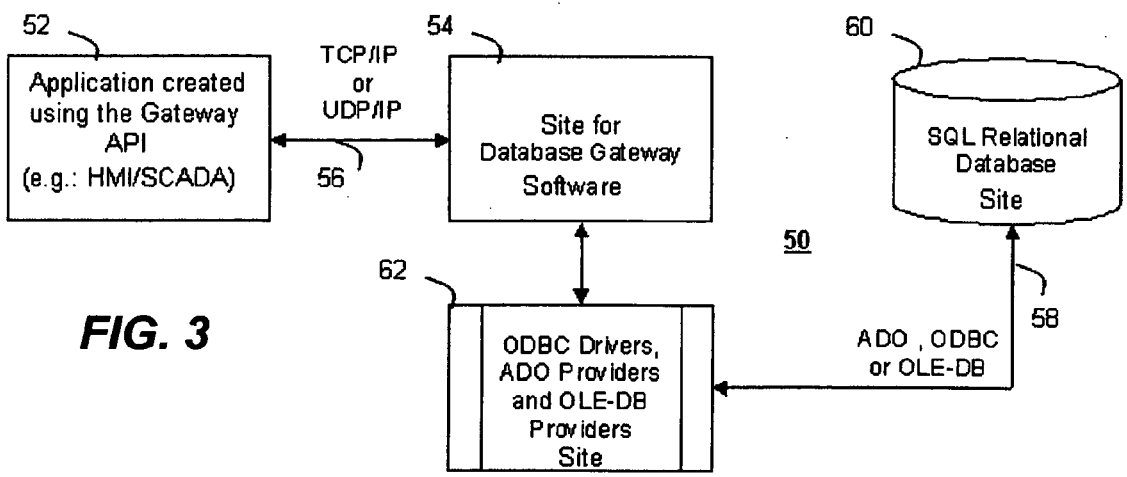
FIG. 3 illustrates an software architecture diagram for the embodiment of FIG. 2.

FIG. 3 illustrates a software architectural diagram 50 for one embodiment of database communications system 30 of FIG. 2. Distinct software applications associated in the present architecture, which may include HMI/SCADA software or other data rich applications 52, communicate with database gateway software 54 via TCP/IP or UDP/IP protocol software 56. Database gateway software 54 connects two different software applications, 52 and SQL relational database drivers, which use different protocols for storing or interpreting data. Rapid Application Development software 52 exchanges data with the database gateway software 54 using TCP/IP or UDP/IP software 56 over any physical layer supported by these protocols. Therefore, Rapid Application Development software 52 and database gateway software 54 may run on the same platform or on different platforms. By this way, even if the application site 32 on which Rapid Application Development software 52 operates does not support the ADO®, OLE-DB® or ODBC® interfaces, Rapid Application Development software 52 may exchange data with remote database software 60 through the database gateway software 54, which may operate at database gateway site 34.

In operation, database gateway software 54 communicates with one or more of a variety of driver software systems 62, such as ODBC® software drivers, ADO® providers, and/or OLE-DB® providers for access via path 58 to SQL relational database software 60. A SQL relational database at database file site 40 uses a structured query language, which is a cross-platform language permitting the user to select, update, insert or delete data in a relational database. ODBC® software drivers provide an applications programming interface interfaces to databases such as Microsoft SQL Server®, Oracle®, and Microsoft® ODBC® desktop database drivers, which support Microsoft® Access®, Excel®, and dBase®. ODBC® is typically used with tools such as DAO® or ADO®. ADO® provides a Microsoft® technology used by developers to connect applications to databases.

Figure 4:
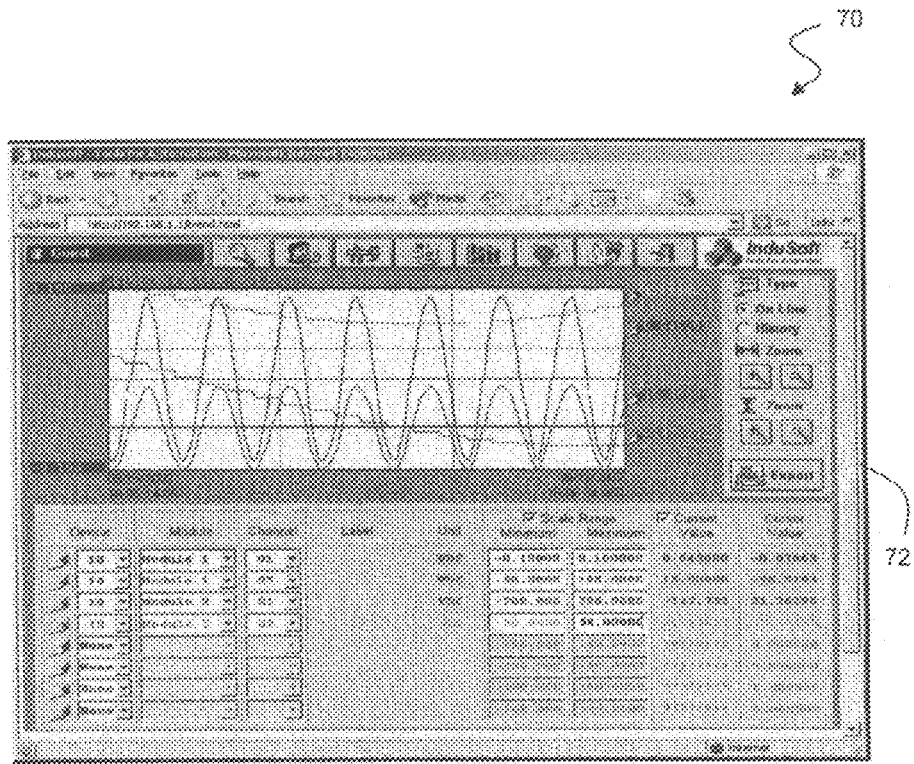
FIGS. 4 and 5 show an exemplary application that may form an integral part of the present embodiment.

FIG. 4 shows user interface 70 from an exemplary application 72 that may operate at application site 32. Such an application may be the InduSoft® Web Studio®, which may operate at application site 32 to provide a powerful, integrated collection of automation tools for developing graphical real-time applications operable to run native on Windows® NT®, 2000®, XP®, CE® and CE.NET® operating systems, for example, or in an Internet and Intranet environment. Rapid Application Development Environment 72 provides a simple drag-and-drop, point-and-click development environment enabling the user to mimic complex behavior of live processes. Such processes may operate in a factory, oilfield, operational environment, or other industries where rich data and graphical applications are a requirement.

To emphasize the significant operational improvements that the disclosed subject matter makes possible, the following discussion details selected aspects of Rapid application Development Environment 72. 72 operating in combination with database communications system 30, a robust set of functions at both the device and overall system levels emerge.

Rapid Application Develpoment Environment 72 uses real-time, graphical interface 70 to develop a variety of applications such as industrial automation, instrumentation, and embedded systems application programs. From the use of Rapid Application Environment 72, a user may publish real-time dynamic and animated graphic screens, trends, alarms, reports, and recipes to standard browsers, while allowing data exchange between wireless and mobile devices. Alarms may be user-defined set points that indicate when a machine or process has gone out of normal operating parameters, or is going out of normal operating parameters. Events may be the occurrence of a user-defined condition that requires notification or recording. Recipes include collections of information used to define process or machine parameters for a specific manufacturing operation. Trends may provide the real-time or historical tracking of machine or process measurements. Moreover, a viewer may provide a software application for viewing database information and related operations.

Rapid Application Development Environments 72 may support a multi-dimensional interface in the Web Thin Client environment, as well as permit creating stand-alone and Web applications from the same development environment for applications running on Windows NT®, Windows 2000®, Windows XP®, and Windows CE®, CE .NET, or on the Web. Rapid Application Development Environment 72 may integrate seamlessly with Windows desktop applications (such as Microsoft® Word® and Excel®), while interfacing with other third-party packages such as Java®, C, C++, and Visual Basic®. Rapid Application Development Environment application 72 may support ActiveX® for Web thin clients to allow a user to view multiple Web thin client applications from a common Web browser (such as Microsoft® Internet Explorer® or Netscape®) through the Internet/Intranet and exchange data with a server using a TCP/IP protocol.

Using Rapid Application Development Environment 72 provides the user with the ability to provide online configuration, debugging, and remote application management capabilities, including extensive development support tools such as message register, error codes, event codes, Database Spy®, and LogWin®. Rapid Application Development Environment 72 includes a powerful, flexible tags database with boolean, real, string, and array tags, classes, and indirect pointers and provides tools for configuring applications in conformance with the FDA 21 CRF Part 11 regulation.

An advanced math library including, for example, 100 or more standard functions while employing a flexible and easy-to-use scripting language permits programming in providing multi-level security for applications, including use over Intranets and Internet may associate with Rapid Application Development Environment 72. Rapid Application Development Environment 72, in the present embodiment, also conforms to industry standards such as Microsoft DNA®, OPC®, DDE, ODBC®, XML, and ActiveX® to provide automatic language translation at runtime as well as internationalization using Unicode language. The robust functionality of Rapid Application Development Environment 72 permits trending functions for keeping track of process behavior online or through historical trending and sends information across a network for monitoring on screens or Web browsers.

Rapid Application Development Environment application 72 may distribute information throughout the network for easy monitoring on application screens or via Web browsers. In addition, graphics features of Rapid Application Development Environment 72 may permit creating sophisticated interfaces with point and click, drag and drop ease. Rapid Application Development Environment application 72 may import graphics from more than 15 different formats for enhanced and realistic screens and includes full-featured screen objects and dynamics with customizable object properties, such as bar graphs, color, resizing, blinking, animation, scale, fill, positioning, rotation, commands, hyperlinks, combo-boxes, and text input/output. The present disclosure includes an object-oriented environment for simple application development and screen and object re-usability and that uses an extensive symbol library to simplify development as a part of Rapid Application Development Environment 72.

Rapid Application Development Environment 72 provides a sophisticated alarms management system that allows the user to send alarms to various utilities such as screen, e-mail, and Web browser, and archive to the printer. A user may store notes after acknowledgement of alarm(s) using, for example, a free format alarm message and secondary search keys. Rapid Application Development Environment 72 has the ability to archive alarms to a file, printer, or to a database and filters, sorts, or color sorts alarms for easier visual interpretation. Moreover, Rapid Application Development Environment 72 may filter alarms by categories at runtime.

Recipes and reports may also be provided by Rapid Application Development Environment 72 to create flexible, user-defined recipe groups, import and export recipes, reports, and real-time data in XML format, as well as publish real-time dynamic and animated graphic screens, trends, alarms, reports, and recipes to standard Web browsers. Input/output from Rapid application Development Environment 72, which may include more than 200 communication drivers that support OPC (server & client) software and various PC Control packages. Rapid Application Development Environment 72 conforms to Microsoft®.NET®, OPC®, DDE, ODBC®, XML, SOAP®, and ActiveX® industry standards, while also providing context-sensitive help functions.

Figure 5:
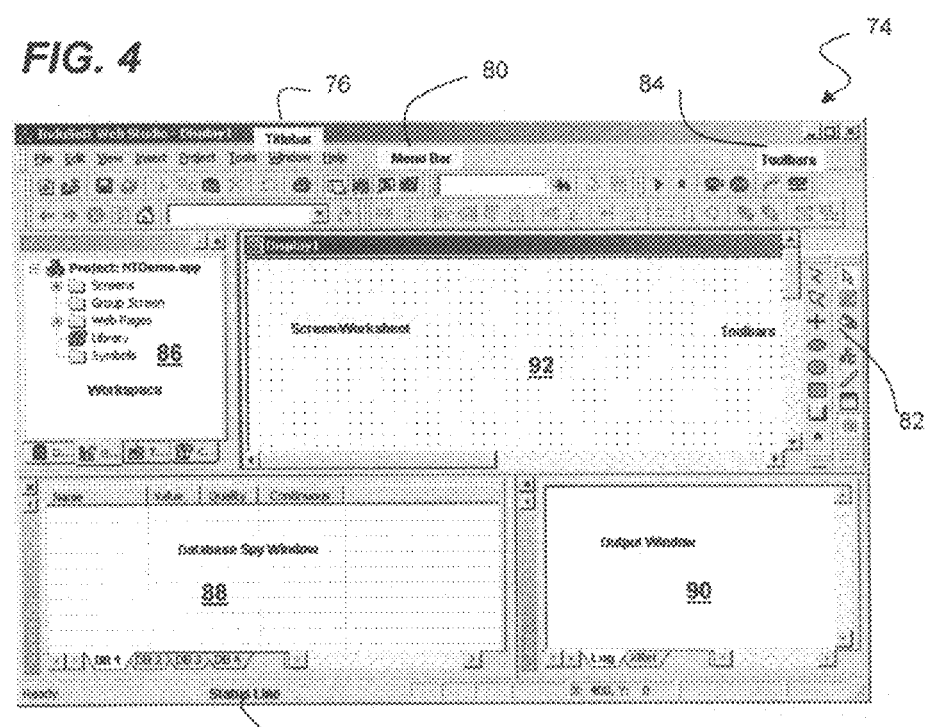

As yet a further demonstration of the above functionally, FIG. 5 shows development environment 74 for the use of Rapid Application Development Environment application 72. Development environment 74 includes title bar 76 for indicating the active screen or worksheet. Status bar 78 provides quick access to actual information, and menu bar 80 includes the main product options and controls, which the user may easily access using the cursor or your keyboard keys. Auxiliary toolbars 82 provide shortcuts to the main commands used in the development environment. Displays building toolbars 84 includes features and tools used to create or edit objects and dynamics in the application screens. Workspace 84 provides tree-view control from which the user may access project worksheets and screens. Database spy window 66 provides a debugging tool, which the user may use to monitor and force tags and to execute functions. Output window 90 displays debugging messages, and Screen/Worksheets window 92 provides an area where the user may edit screens and worksheets. Note that FIG. 5 shows the development environment areas and windows in their default position. The user may customize this environment as needed by changing the position of the areas. In particular, the use may right-click the mouse almost anywhere inside the development environment to display a pop-up menu relating to the context on which the click occurs.

Figure 6:
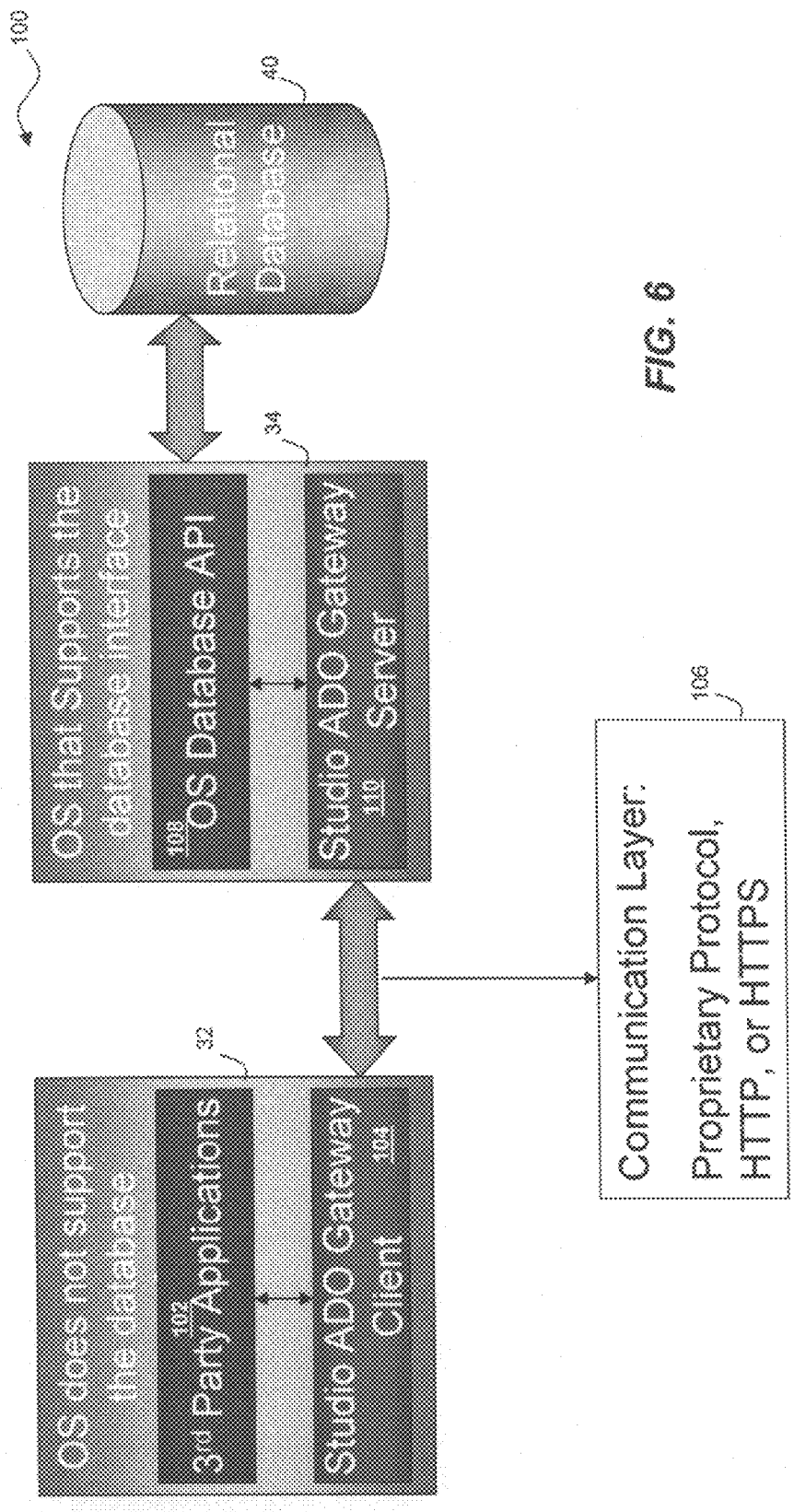
FIG. 6 shows functional aspects of the gateway process and system of one embodiment of the disclosed subject matter.

FIG. 6 shows more generally the functional aspects of the gateway process and system 100 of one embodiment of the disclosed subject matter, which process occurs using database gateway software 54 at database gateway site 34. In particular, gateway process and system 100 permits communication from application site 32, which may operate using an operating system (OS) that does not support access to databases such as relational database. As discussed above, applications site 32 includes various third party applications 102, such as HMI/SCADA application 72. These third party applications 102 may communicate with, for example, a studio ADO® gateway client 104. Communication layer 106 provides proprietary, /http:, or /https: protocols for allowing communication with database gateway site 34. Database gateway site 34 operates, as will be discussed further, an operating system database API 108 or set of functions exported through a library which third party applications 72, may call to perform database operations. Database API 108 interfaces, for example, ADO gateway server 110. With the functionality at database gateway site 34, access with relational database 60 at the local or remote relational database site 40 may occur.

FIG. 7 presents an exemplary client-server environment 120 in which to practice aspects of database communications software 54 of the present disclosure. In particular, the example shows studio ADO® gateway client 104 to include API software 122, which communicates with parser 124. Parser 124 interfaces protocol stack 126, all as components of studio ADO® gateway client 104. Through communication path 128, communications from studio ADO gateway client 104 occur with OS communication API 130. From OS communication API 130, communications occur via path 132 with OS communications API 134. OS communications API 136 provides the communications software for communications with studio ADO® gateway server 138 via path 136. Studio ADO® gateway server 138 includes protocol stack 140, which interfaces OS communications API 138 as an initial step in communications. From protocol stack 138, communications signals occur with parser 140, which further communicates with database interface block 142.

Studio ADO® gateway client API 122 provides a set of functions that may be exported through a library of third party applications seeking to perform database operations. Parser 124 of studio ADO® gateway client 104 and parser 140 of studio ADO® gateway 110 translate requests and/or replies into commands and format the data to permit OS independent communications. Protocol stack 126 of studio ADO® gateway client 104 and protocol stack 138 of studio ADO® gateway server 110 format data according to the protocol in use and send the information to the respective OS communication API 130 or 134. The OS Communication APIs 130 and 134, for example, may be Berkeley Sockets®, WinSock®, Serial Communication APIs, etc. Database interface block 142 receives the requests from parser 140 and translates the requests into OS Database API calls to access particular SQL relational databases.

Parsers 124 and 140 are generic and may interface with any different relational databases. Also, each of parser 124 and 140 has the ability to work with systems that are based on Unicode, as well as ones not based on Unicode. The present embodiment achieves this feature by always translating each character from a given application into two bytes in parser 124. On server side 110, parser 140 determines whether the information should be used as one or two bytes. Parser 124 on client side 104 differs from parser 140 on server side 110 in that receives function calls and translates the received data. The information that is delivered to OS communications API 130 includes the function call and translated data. This information is then communicated to OS communications API 130 and protocol stack 138. In response, parser 140 on server side 110 simply requests data from the database file 60 and receives back the information for use ultimately on client side 104.

Protocol stack 126 on client side 104 and protocol stack 138 on server side 110 provide commands for mimicking the operations that may be performed at database file 60. Thus, if an application 52 calls to database file 60 requesting data, protocol stack 126 translates the request to code that may be received by protocol stack 138. In so doing, protocol stack 126 adds a header that properly identifies the information from parser 124. Then, protocol stack 138 strips the header from the data and prepares the data for its being presented to parser 140.

With the present embodiment, passwords may be passed between protocol stack 126 on client side 104 and protocol stack 138 on server side 110. This operation includes encrypting passwords and other data, as appropriate, by protocol stack 126 and decrypting such passwords and other data by protocol stack 138 on server side 110. These operations may or may not occur with the knowledge and awareness of the user, according to the overall system configuration and security policies.

FIG. 8 depicts functional aspects of a relational database 60 that may be accessed using an embodiment of the disclosed subject matter. Relational database 60 may include, for example, Table X 150 and Table Y 152. Each such Table 150 and 152 provides the ability to store in different registers, e.g., Registers 1, 2, and 3 data in corresponding fields, e.g., Fields A, B, and C. Typically, the fields are pre-defined and the application adds or reads one or more registers, according to the query condition. SQL relational database 60 may reside within a desktop computer. SQL relational database 60, therefore, provides a set of information stored in tables with fields and registers, which support SQL commands.

Database communication system 30 of the present disclosure implements a generic access so, for example, HMI/SCADA application 72 may route requested remote database operations to a desktop computer running Windows XP® or Windows 2000®, where it uses ADO.NET® to provide an intuitive, simple, flexible and powerful interface with any database compatible with MDAC (Microsoft Data Access Components), using underlying technologies such as OLE-DB and ODBC®. Database communications system 30 may interface with any relational database supported by a valid ADO.NET® provider, OLE-DB provider, or ODBC® driver. These include, for example, Microsoft SQL Server 2000®, Microsoft Access 2000®, Microsoft Excel 2000®, Oracle®, Sybase Anywhere®, and MySQL®.

FIG. 9 further portrays an application of the disclosed subject matter enabling the access to and communications with a plurality of databases operating under a variety of protocols for a variety of applications. Specifically, various alarms, events, trends, and other applications may feed from third party applications 72, described above. Referring to FIG. 9, alarms, events, trends functions of a studio application 162 may be located at one or more remote locations 32 communicate with database gateway 54. Database gateway 54 may selectively and in a coordinated manner, communicate with operating systems of different database providers, such as those from SQL Server® 164, Oracle® 166, OLE-DB® 168 and 170, and/or ODBC® drivers 172. In addition, communications may occur using the Microsoft Jet® OLE-DB provider drivers 174 and 176. Similarly, ODBC® drivers 172 may communicate with OBDC® driver for CSV® file 178.

These applications and relative functions may take place at a single database communications gateway location 34 or at any number of different locations, depending on the system configuration. Then, a family of relational databases, including, for example, SQL Server® 180, Oracle® 182, Microsoft® Access (using the *.mdb file format), Excel®, and CSV® file 188. Such databases may be commonly or separately located with one another, as well as commonly or separately located with the database gateway software 52.

In other words, database communications system 30 uses database providers (ADO.NET®) 164 through 172 to interface with databases 180 through 188. Database providers 164 through 172 include libraries developed to access data from different databases through SQL commands. The ADO.NET® provider for a specific database may be supplied by the operating system or by the database manufacturer. FIG. 9 further illustrates how database communications system 30 may interface with different databases using a different database provider for each database 60. Notice in FIG. 9 that the Microsoft ADO.NET® provider for ODBC drivers 172 allows the user to access the CSV® file database 188 through an ODBC® driver 178. It is also possible that the user may not have an ADO.NET® provider, but an OLE-DB provider 174 and 176 may be available. By using the Microsoft ADO.NET® provider 168 and 170 for OLE-DB, the user may access the respective databases, here Microsoft Access® database 184 and Excel® database 186, respectively. Microsoft Jet® OLE-DB providers 174 and 176 give access to applications in the Microsoft Office® package by using this approach.

It is important to note that database communications system 30 provides the interface for ADO.NET® providers 164 through 172. However, the ADO.NET® providers 164 through 172 and/or the OLE-DB providers 174 and 176, and ODBC® driver 178 must be supplied either by the operating system or by the database manufacturer. If a connection string does not refer to a valid ADO.NET® provider, the disclosed subject matter may use the OLE.DB provider 174 and 176, for example.

Although most applications typically link to only one type of database, database communications system 30 gives the user the flexibility to link each task to a specific database supported by a database provider. Furthermore, by using an architecture similar to that here provided, the user need have no worries about the specific characteristics of each database. Such will be mostly handled by the database provider for each database or by the database gateway software 54. Therefore, the application settings are mostly uniform, regardless of the specific database chosen.

Depending on the architecture of a given project employing database communications system 30, ADO.NET® provider 194 for SQL relational database 180 may not be available in the same stations where Rapid Application Development Environment 72 runs. This scenario is especially common when the application is run on the Windows CE® operating system. At present, most of the providers are not supported for the Windows CE® operating system.

In summary, techniques are here disclosed for communicating between an industrial apparatus and at least one remote database for a wide variety of applications, including B2B applications, human machine interface and supervisory control and data acquisition. This disclosure includes a database gateway for enabling communications between a plurality of applications and a predetermined database. The plurality of applications may reside on an industrial apparatus not operating database driver interfaces. A database gateway process and system interfaces between the plurality of applications and at least one driver application for providing access to a database, such as a relational database. The plurality of application interfaces access a predetermined database, such as a relational database, by communicating signals with the database gateway. A parser translates the communications signals from the application program interfaces into commands and formatted data, which commands and formatted data are operating system independent signals. A protocol stack formats the operating system independent signals to form formatted signals, which accord with a predetermined protocol and further communicates the formatted communications signals to at least one database interface. The database interface receives and translates the formatted communications signals into database access commands for communicating with the predetermined database.

The processing features and functions described herein may be implemented in various manners. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A database communications system for enabling communications between a plurality of application programs operating on an embedded electronic device and a remote relational database, comprising:
    an embedded electronic device; and
    a remotely accessible database gateway site operable as middleware between at least one application operating on said embedded electronic device and a remote relational database;
    said database gateway site for communicating with at least one standard database provider;
    a communications path for connecting said embedded electronic device and said remotely accessible database gateway site;
    wherein said embedded electronic device comprises:
        at least one standard application program interface for interfacing with said at least one application program to perform a requested remote database operation, said at least one application program seeking access to said remote relational database through said at least one standard database provider and operating on an operating system, said operating system operating without the support of said at least one standard database provider;
        a first parser for translating said requested remote database operation into commands and formatted data, said commands and formatted data of an operating system independent form; and a first protocol stack for formatting said commands and said formatted data into header formatted data, said header formatted data formatted to accord with a protocol, said first protocol stack further for sending said header formatted data to said remotely accessible database gateway site;

and wherein said remotely accessible database gateway site comprises:

a second protocol stack for receiving said header formatted data and removing header data from said header formatted data for generating database requests;

a second parser for receiving said database requests, generating from said database requests a plurality of database formatted commands, and sending said database formatted commands through said at least one standard database provider;

a database interface for interfacing with said remote relational database and performing said database commands on said remote relational database;

a communications path for connecting said database gateway site and said remote relational database.

2. The database communications system of claim 1, wherein said at least one application program comprises a human machine interface application program.

3. The database communications system of claim 1, wherein said at least one application program comprises a supervisory control and data acquisition application program.

4. The database communications system of claim 1, wherein said database formatted commands comprise open database connectivity formatted commands.

5. The database communications system of claim 1, wherein said database formatted commands comprise structured query language relational database formatted commands.

6. The database communications system of claim 1, wherein said database formatted commands comprise ActiveX® database object formatted commands.

7. The database communications system of claim 1, wherein said operating system supporting said at least one application program interface comprises a Windows CE® operating system.

8. The database communications system of claim 1, wherein said operating system supporting said at least one application program interface comprises a Linux® operating system.

9. The database communications system of claim 1, wherein said operating system supporting said at least one application program interface comprises an embedded operating system.

10. The database communications system of claim 1, wherein said at least one application program determines alarm conditions associated with an industrial apparatus.

11. The database communications system of claim 1, wherein said at least one application program determines events associated with an industrial apparatus.

12. The database communications system of claim 1, wherein said at least one application program determines operational trends associated with an industrial apparatus.

13. The database communications system of claim 1, wherein said at least one application program associated with recipes for the operation of an industrial apparatus.

14. The database communications system of claim 1, wherein said at least one application program controls operational characteristic viewer functions associated with the operation of an industrial apparatus.

15. The database communications system of claim 1, wherein said at least one application program controls web-based functions relating to the operation of an industrial apparatus.

16. The database communications system of claim 1, further comprising a wireless communications path between said first protocol stack and said second protocol stack.

17. The database communications system of claim 1, further comprising a TCP/IP communications path between said first protocol stack and said second protocol stack.

18. A method for enabling communications between a plurality of application programs operating on an embedded electronic device and a remote relational database, comprising:

interfacing with at least one application program operating on an embedded electronic device to perform a requested remote database operation, said at least one application program seeking access to a remote relational database through at least one standard database provider and operating on an operating system, said operating system operating without the support of said at least one standard database provider;

translating said requested remote database operation into commands and formatted data, said commands and formatted data of an operating system independent form;

formatting said commands and formatted data into header formatted data, said header formatted data formatted to accord with a protocol and sending said header formatted data to a remotely accessible gateway site;

receiving at said remotely accessible gateway site said header formatted data and removing header data from said header formatted data for generating database requests;

receiving at said remotely accessible gateway site said database requests, generating from said database requests a plurality of database formatted commands, and sending said database formatted commands to said remote relational database through said at least one standard database provider; and interfacing with said remote relational database and performing said database formatted commands on said remote relational database.

19. The communications method of claim 18, wherein said step of interfacing with at least one application program further comprises the step of interfacing a human machine interface application program.

20. The communications method of claim 18, wherein said step of interfacing with at least one application program further comprises the step of interfacing a supervisory control and data acquisition application program.

21. The communications method of claim 18, wherein said remote relational database comprises an open database connectivity database and further wherein said step of interfacing with said remote relational database comprises the step of performing said database formatted commands on said open database connectivity database.

22. The communications method of claim 18, wherein said remote relational database comprises a structured query language relational database and further wherein said step of interfacing with said remote relational database comprises the step of performing said database formatted commands on said structured query language relational database.

23. The communications method of claim 18, wherein said remote relational database comprises a ActiveX database object relational database and further wherein said step of interfacing with said remote relational database comprises the step of performing said database formatted commands on said ActiveX database object relational database.

24. The communications method of claim 18, wherein said step of interfacing with at least one application program further comprises the step of interfacing with at least one application program seeking access to said remote relational database through at least one standard database provider and operating on a Windows CE® operating system, said Windows CE® operating system operating without the support of said at least one standard database provider.

25. The communications method of claim 18, wherein said step of interfacing with at least one application program further comprises the step of interfacing with at least one application program seeking access to said remote relational database through at least one standard database provider and operating on a Linux® operating system, said Linux® operating system operating without the support of said at least one standard database provider.

26. The communications method of claim 18, wherein said step of interfacing with at least one application program further comprises the step of interfacing with at least one application program seeking access to said remote relational database through at least one standard database provider and operating on an embedded operating system, said embedded operating system operating without the support of said at least one standard database provider.

27. The communications method of claim 18, wherein said step of interfacing with at least one application program further comprises the step of interfacing with at least one application program, said at least one application program for determining alarm conditions associated with an industrial apparatus.

28. The communications method of claim 18, wherein said step of interfacing with at least one application program further comprises the step of interfacing with at least one application program, said at least one application program for determining events associated with an industrial apparatus.

29. The communications method of claim 18, wherein said step of interfacing with at least one application program further comprises the step of interfacing with at least one application program, said at least one application program for determining operational trends associated with an industrial apparatus.

30. The communications method of claim 18, wherein said step of interfacing with at least one application program further comprises the step of interfacing with at least one application program, said at least one application program for associating with recipes for the operation of an industrial apparatus.

31. The communications method of claim 18, wherein said step of interfacing with at least one application program further comprises the step of interfacing with at least one application program, said at least one application program for associating with operational characteristic viewer functions associated with the operation of an industrial apparatus.

32. The communications method of claim 18, wherein said step of interfacing with at least one application program further comprises the step of interfacing with at least one application program, said at least one application program for associating with web-based functions relating to the operation of an industrial apparatus.

33. The communications method of claim 18, further comprising the step of communicating between said embedded electronic device and said remotely accessible gateway site using a wireless communications path.

34. The communications method of claim 18, further comprising the step of communicating between said embedded electronic device and said remotely accessible gateway site using a TCP/IP communications path.

35. A computer readable medium encoded with a program for enabling communications between a plurality of applications operating on an embedded device and a remote relational database, the program comprising the steps of:

interfacing with at least one application program operating on an embedded electronic to perform a requested remote database operation, said at least one application program seeking access to a remote relational database through at least one standard database provider and operating on an operating system, said operating system operating without the support of said at least one standard database provider;

translating said requested remote database operation into commands and formatted data, said commands and formatted data of an operating system independent form;

formatting said commands and formatted data into header formatted data, said header formatted data formatted to accord with a protocol and sending said header formatted data to a remotely accessible database gateway site;

receiving at said remotely accessible database gateway site said header formatted data and removing header data from said header formatted data for generating database requests;

receiving at said remotely accessible database gateway site said database requests, generating from said database requests a plurality of database formatted commands, and sending said database formatted commands to said remote relational database through said at least one standard database provider; and interfacing with said remote relational database and performing said database formatted commands on said relational database.

36. The computer readable medium of claim 35, wherein said step of interfacing with at least one application program further comprises the step of interfacing a human machine interface application program.

37. The computer readable medium of claim 35, wherein said step of interfacing with said at least one application program further comprises the step of interfacing a supervisory control and data acquisition application program.

* * * * *